US007076687B2

(12) United States Patent
Fujibayashi et al.

(10) Patent No.: US 7,076,687 B2
(45) Date of Patent: Jul. 11, 2006

(54) SYSTEM AND METHOD FOR BI-DIRECTIONAL FAILURE DETECTION OF A SITE IN A CLUSTERING SYSTEM

(75) Inventors: Akira Fujibayashi, Sunnyvale, CA (US); Kenji Yamagami, Los Gatos, CA (US); Toshiyuki Abe, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 657 days.

(21) Appl. No.: 10/273,048

(22) Filed: Oct. 16, 2002

(65) Prior Publication Data

US 2004/0078644 A1 Apr. 22, 2004

(51) Int. Cl.
*G06F 11/00* (2006.01)
(52) U.S. Cl. ................. 714/6; 714/5; 714/42
(58) Field of Classification Search .......... 714/5, 714/6, 42
See application file for complete search history.

(56) References Cited

U.S. PATENT DOCUMENTS

| | | | |
|---|---|---|---|
| 5,459,857 A | 10/1995 | Ludlam et al. | |
| 5,544,347 A | 8/1996 | Yanai et al. | |
| 5,561,825 A | 10/1996 | Yamagami et al. | |
| 5,592,630 A | 1/1997 | Yamagami et al. | |
| 5,699,510 A | 12/1997 | Petersen et al. | |
| 5,928,367 A | 7/1999 | Nelson et al. | |
| 5,933,653 A | 8/1999 | Ofek | |
| 6,035,415 A | 3/2000 | Fleming | |
| 6,052,797 A | 4/2000 | Ofek et al. | |
| 6,163,855 A | 12/2000 | Shrivastava et al. | |
| 6,247,140 B1* | 6/2001 | Chase-Salerno et al. | 714/2 |

(Continued)

FOREIGN PATENT DOCUMENTS

| | | |
|---|---|---|
| EP | 0 981 091 A2 | 2/2000 |
| WO | WO 98/59291 | 12/1998 |
| WO | WO 00/07105 | 2/2000 |

OTHER PUBLICATIONS

CAI, Jack and Simon Leung; "Building Highly Available Database Servers Using Oracle Real Application Clusters—An Oracle White Paper"; May 2002; 18 pages; Copyright 2002 Oracle Corporation. URL:http://otn.oracle.com/products/oracle9i/pdf/rac_building_ha_rel2.pdf.

(Continued)

*Primary Examiner*—Robert Beausoliel
*Assistant Examiner*—Michael Maskulinski
(74) *Attorney, Agent, or Firm*—Sughrue Mion, PLLC; Pavel Pogodin, Esq.

(57) ABSTRACT

A method for failure detection comprises: checking, at a first time, a state of a local volume that is mirrored at a second location; issuing a change state command to the local volume; checking, at a second time, the state of the local volume after a host at the second location issues a change state command; comparing the state of the local volume at the first time and at the second time; and initiating a fail over procedure if the state of the local volume is different at the second time from the first time.

32 Claims, 6 Drawing Sheets

U.S. PATENT DOCUMENTS

| | | | |
|---|---|---|---|
| 6,363,497 | B1 | 3/2002 | Chrabaszcz |
| 6,658,478 | B1* | 12/2003 | Singhal et al. ............... 709/232 |
| 6,785,678 | B1* | 8/2004 | Price .............................. 707/8 |
| 6,785,840 | B1* | 8/2004 | Smith et al. ................... 714/11 |
| 6,847,991 | B1* | 1/2005 | Kurapati ...................... 709/213 |
| 2002/0095489 | A1 | 7/2002 | Yamagami |
| 2003/0005350 | A1* | 1/2003 | Koning et al. .................. 714/4 |
| 2003/0046602 | A1* | 3/2003 | Hino et al. ..................... 714/4 |

OTHER PUBLICATIONS

Hitachi Freedom Storage™ Software Solutions Guide, Best of Breed Software for Centralized Storage Management; Hitachi Data Systems; May 2002; Includes cover pages, Table of Contents, Table of Figures and pp. 1-93; Copyright 2002, Hitachi Data Systems Corporation. URL:http://www.hds.com/pdf/DISK-436-00.pdf.

* cited by examiner

| Remote Copy Heartbeat Enable | Enable | 510 |
|---|---|---|
| Remote Group Status | Alive | 520 |
| Device Address (1) | /dev/c1t1d2 | 530 |
| Device Status (1) | Enable | 540 |
| Device Address (2) | /dev/c1t1d3 | 550 |
| Device Status (2) | Enable | 560 |
| ... | ... | |
| Device Address (n) | NULL | 570 |
| Device Status (n) | Disable | 580 |

| volume pair | STATE | 610 |
|---|---|---|
| Device Address(1) | "PVOL"/"Mirrored" | 620 |
| Device Address(2) | "PVOL"/"Mirrored" | 630 |
| .... | .... | |
| Device Address(l) | "SMPL" | 640 |
| Device Address(k) | "SMPL" | 650 |
| .... | .... | |

SYSTEM AND METHOD FOR BI-DIRECTIONAL FAILURE DETECTION OF A SITE IN A CLUSTERING SYSTEM

TECHNICAL FIELD

This invention relates generally to cluster systems, and more particularly, but not exclusively, provides a system and method for failure notification of a site in a clustering system.

BACKGROUND

"Clustering" is a known technique of connecting multiple computers (or host servers) and enabling the connected computers to act like a single machine. Clustering is used for parallel processing, for load balancing, and for fault tolerance. Corporations often cluster servers together in order to distribute computing-intensive tasks and risks. If one server in the cluster computing system fails, then an operating system can move its processes to a non-failing server in the cluster computing system, and this allows end users to continue working while the failing server is revived.

Cluster computing systems are becoming popular for preventing operation interruptions of applications. Some cluster computing systems have two groups of hosts (e.g., servers), wherein one host group works as the production system, while the other host group works as the standby system. One host group is typically geographically dispersed (e.g., several hundred miles) from the other host group. Each host group has its own associated storage system (e.g., a disk system). These two storage systems typically implement remote mirroring technology that is discussed below. Therefore, the associated storage system connecting to the standby host group contains the same data as the associated storage system connecting to the production host group.

The network connecting two host server groups is typically a Wide Area Network (WAN), such as the Internet. The two host server groups can communicate over the network to determine error checking, etc. WANs are not typically reliable since WANs are often subject to failure. Transfer of data across the Internet can be subject to delays and data loss. Therefore, because a standby host group may erroneously interpret a network problem (e.g., link failure or data transmission delay) as a failure state of the production host group, a standby host group may inappropriately take over the processes of the production host group (even if there is no failure in the production host group).

The host group in the production system may access a storage volume commonly known a primary volume (PVOL) in the associated storage system of the production system host group. Similarly, the host group in the standby system may access a storage volume commonly known a secondary volume (SVOL) in the associated storage system of the standby system host group. The primary volume (PVOL) is mirrored by the secondary volume (SVOL). A storage system may have both PVOLs and SVOLs.

Storage-based remote mirroring technology creates and stores mirrored volumes of data between multiple storage volumes maintained over a given distance. Two disk systems are directly connected by remote links such as an Enterprise System Connectivity (ESCON) architecture, Fibre Channel, telecommunication lines, or a combination of these remote links. The data in the local disk system is transmitted via remote links to and copied in the remote disk system. These remote links are typically highly reliable, in comparison to a usual network such as the Internet. If an unreliable remote link fails, then this failure may disadvantageously result in the loss of data.

U.S. Pat. Nos. 5,459,857 and 5,544,347 both disclose remote mirroring technology. These patent references disclose two disk systems connected by remote links, with the two disk systems separated by a distance. Mirrored data is stored in disks in the local disk system and in the remote disk system. The local disk system copies data on a local disk when pair creation is indicated. When a host server updates data on the disk, the local disk system transfers the data to the remote disk system through the remote link. Thus, host operation is not required to maintain a mirror data image of one disk system in another disk system.

U.S. Pat. No. 5,933,653 discloses another type of data transferring method between a local disk system and a remote disk system. In synchronous mode, the local disk system transfers data to the remote disk system before completing a write request from a host. In semi-synchronous mode, the local disk system completes a write request from the host and then transfers the write data to the remote disk system. Subsequent write requests from the host are not processed until the local disk system completes the transfer of the previous data to the remote disk system. In adaptive copy mode, pending data to be transferred to the remote disk system is stored in a memory and transferred to the remote disk system when the local disk system and/or remote links are available for the copy task.

There is a need for a system and method that will overcome the above-mentioned deficiencies of conventional methods and systems. There is also a need for a system and method that will increase reliability of cluster computing systems and improved failure detection in these computing systems. There is also a need for a system and method that will accurately detect failure in the production host group of a cluster system so that the standby host group is prevented from taking over the processes of the production host group when the production host group has not failed.

SUMMARY

The present invention provides a system and method for failure detection of a remote site. The system comprises a first engine that issues change state commands to a local volume that is mirrored at a secondary site. A second engine, coupled to the first engine, checks the state of the local volume before the first engine issues a change state command. In addition, the second engine checks the state of the local volume after a host at the secondary site issues a change state command. Further, the second engine compares states of the local volume at the two checks and initiates fail over procedures if the states are different.

In an embodiment of the invention, change state commands can include changing the local volume between a primary volume state and a secondary volume state. In another embodiment, the change state commands can include changing the local volume between a mirrored state and a suspended state.

In another embodiment of the invention, the second engine can initiate a second failure detection method before initiating fail over procedures. In another embodiment of the invention, the second engine can also inform a system operator of the failure.

The method comprises: checking, at a first time, a state of a local volume that is mirrored at a second location; issuing a change state command to the local volume; checking, at a second time, the state of the local volume after a host at the second location issues a change state command; comparing the state of the local volume at the first time and at the second time; and initiating a fail over procedure if the state of the local volume is different at the second time than the first time.

Accordingly, the system and method advantageously enable failure detection of a site in a cluster system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
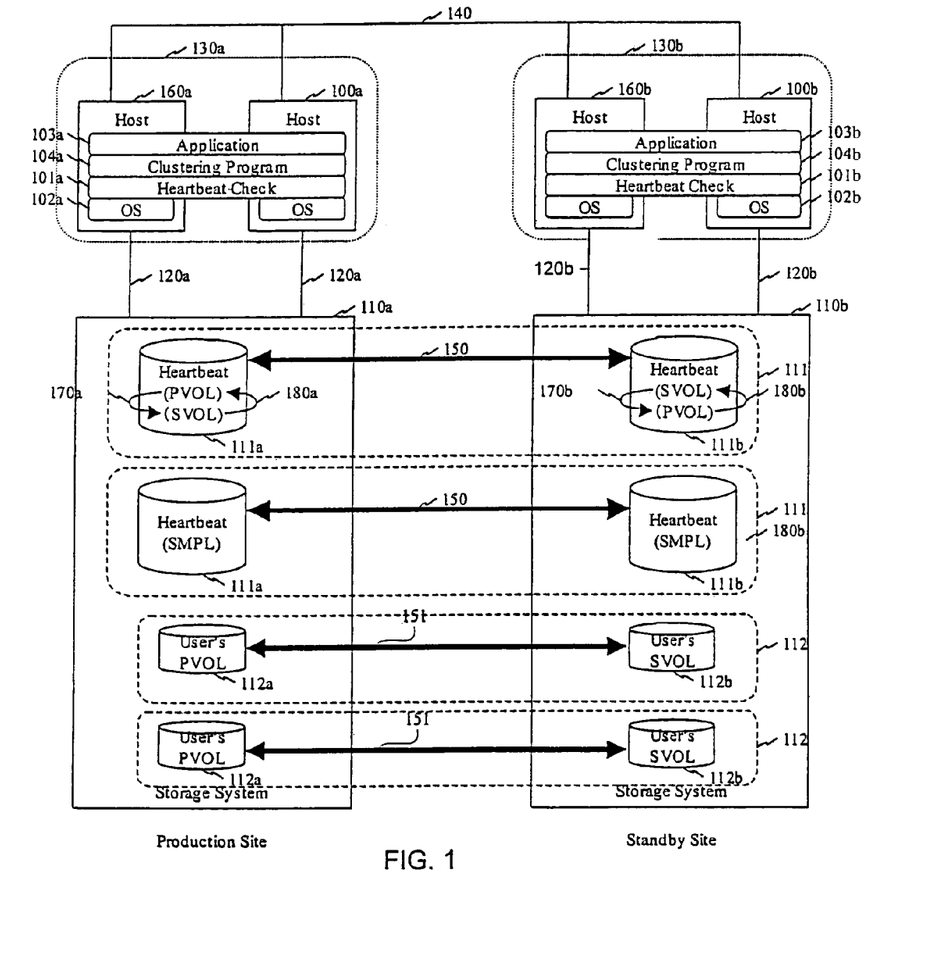
FIG. 1 is a block diagram illustrating a system in accordance with an embodiment of the present invention.

FIG. 1 is a block diagram illustrating a system 50a in accordance with an embodiment of the present invention. The system 50a comprises two host groups that are shown as primary group (production host group) 130a and secondary group (standby host group) 130b. The secondary group 130b may be substantially similar to primary group 130a. Accordingly, a description of primary group 130a and its components can be considered also as a description of secondary group 130b. The primary group 130a is typically located in a production site and is remote from the secondary group 130b which is typically located in a standby site. The primary group 130a comprises one or more hosts 100a and 160a, and the secondary group 130b comprises one or more hosts 100b and 160b. The hosts are typically servers.

Each host 100a and 160a has an application 103a, clustering program 104a, heartbeat check 101a, and operating system 102a. Application 103a, clustering program 104a, heartbeat 101a, and operating system 102a can run in synchronous on hosts 100a and 160a or run independently on hosts 100a and 160a. Alternatively, a first host (e.g., host 100a or 160a) may independently run application 103a, clustering program 104a, heartbeat 101a, and operating system 102a and a second host can take over running these programs if the first host fails.

In one embodiment, the heartbeat check 101a is a module, software program, firmware, hardware, a combination of these components, or other suitable components. Heartbeat check 101a enables failure detection of a site in cluster system and will be discussed further below in conjunction with FIG. 3

The clustering program 104a permits the hosts groups 130a and 130b to function as a cluster computing system and are conventionally known programs. The heartbeat check 101a can be separate from the clustering program 104a, or may be combined or attached with the clustering program 104a as one program.

The operating system 102a provides APIs (application program interfaces (APIs)) for the clustering program 104a and the heartbeat check 101a to use. For example, the operating system 102a provides "open", "read", "write", and "close" to the storage volumes. Heartbeat check 101a uses these APIs when, e.g., sending a heartbeat message (e.g., "open(vol)" to get a pointer to the volume, "write(message)" to write a message, and "close (vol)" to discard the pointer).

Each host 100a and 160a has its own application 103a if a user specifies accordingly. For example, host 100a may run an Oracle database and host 160a may run a payroll application. If host 100a fails, then Oracle database is opened at host 160a. Thus, host 160a now runs the Oracle database and the payroll application.

Typically, application 103a normally runs at the primary group 130a, while an application 103b at the secondary group 130b is in the standby mode, as is conventionally known in cluster computing systems. When a heartbeat check 101b (in secondary group 130b) determines that there has been a failure in primary group 130a as will be discussed further below, then application 103a "fails over" to the secondary group 130b in the standby site. In other words, when the application 103a fails over to the secondary group 130b, then the application 103b in the secondary group 130b will run for the system 50a.

The paths 120a in FIG. 1 transmit information between the hosts 100a, 160a and the storage system 110a by use of a standard protocol. Examples of the path 120a include SCSI, Fibre channel, ESCON, or Ethernet, which standard protocols are SCSI-3, FCP, ESCON, and TCP-IP, respectively. The paths 120b in FIG. 1 transmit information between the hosts 100b, 160b and the storage system 110b by use of a standard protocol, which may or may not be the same as the protocol used by path 120a.

The present invention chooses one host in the primary group 130a as a master host, such as host 100a, and one host in the secondary group 130b as a master host, such as host 100b. As described below, the master hosts 100a and 100b send "change state" signals or commands and "check state" signals or commands to their respective heartbeat volumes 111a and 111b to determine if a fail over should be performed. Host 160a in primary group 130a may become a master host if the current master host 100a is deemed to have failed or otherwise become non-functional. Similarly, host 100b may become a master host 160b in the secondary group 130b if the current master host 160b is deemed to have failed or otherwise become non-functional.

Hosts 100a and 160a are connected by a network 140 to hosts 100b and 160b. Thus, any of the hosts 100a, 160a in primary group 130a can communicate with any of the hosts 100b, 160b in the secondary group 130b. Typically, the network 140 may be a Local Area Network (LAN) or a Wide Area Network (WAN) such as the Internet.

The primary group 130a is coupled to a storage system 110a in the production site, and the secondary group 130b is coupled to a storage system 110b in the standby site. Each of the storage systems 110a and 110b form, for example, a disk system. Each of the storage systems 110a and 110b may comprise two or more disks. The storage systems 110a and 110b are connected to each other by one or more remote links 150 through which the storage systems 110a and 110b communicate with each other. Typically, the remote links 150 may be ESCON, Fibre Channel, telecommunications lines, or a combination that may include ESCON, Fibre Channel, and telecommunication lines. The remote links 150 are generally more secure, more reliable and faster for communication than network 140.

The disk system (formed by storage systems 110a and 110b) forms a remote data mirroring system and comprises one or more remote mirrors 111. Each remote mirror 111 comprises a storage volume (heartbeat volume) 111a in storage system 110a and a storage volume (heartbeat volume) 111b in storage system 110b. Heartbeat check 101a and 101b, on an alternating basis send change state commands to volumes 111a and 111b respectively. Changing states may include changing a volume between a primary state to a secondary state (or storage state) and/or changing a volume between a mirrored state and suspended (not mirrored) state. When the heartbeat check 101a transmits a conventional change state command to the heartbeat volume 111a, the storage system 110a changes the state of heartbeat volume 111a from a primary state to a storage state (also referred to interchangeably as a secondary state). Storage system 110a also communicates the change in state to storage system 110b via remote link 150 so that storage system 110b can change the state of heartbeat volume 111b between a storage state and a primary state.

Heartbeat check 101a reads the state of heartbeat volume 111a via conventional techniques before issuing the change state command and again after heartbeat check 101b issues a change state command. If there has been a change in state, then there has been a failure of remote link 150, volume 111b and/or secondary group 130b. (It is assumed that links 120a and 120b are stable links (e.g., short cables) and so failure of links 120a and 120b is highly unlikely and therefore not the cause of the changed state.) Similarly, heartbeat check 101b reads the state of heartbeat volume 111b before issuing a change state command and again after heartbeat 101a issues a change state command. If there has been a change in state, then there has been a failure of remote link 150, volume 111a and/or primary group 130a and fail-over procedures can be initiated.

The number of remote mirrors 111, heartbeat volumes 111a, heartbeat volumes 111b, and remote links 150 (linking a heartbeat volume 111a with a heartbeat volume 111b) may vary. A heartbeat volume 111a may fail for many problems. The use of two or more mirrored pairs therefore advantageously achieves higher reliability for the system 50a.

The disk system (formed by storage systems 110a and 110b) further comprises one or more remote mirrors 112 for storing production data. Each remote mirror 112 comprises a primary storage volume in storage system 110a (user's PVOL 112a) and a secondary storage volume in storage system 110b (user's SVOL 112b). As an example, a user's PVOL 112a or 112b comprises a database such as a database available from Oracle Corporation. The user's PVOL 112a or 112b may be storage volumes for storing data from the World Wide Web, text files, and the like. When the application 103a updates data on the user's PVOL 112a, the storage system 110a writes the data to the user's SVOL 112b by use of a conventional remote copy mechanism that transmits the data across a remote link 151 to storage system 110b. Alternatively, remote link 150 may be used. The storage system 110b receives the data transmitted, and the received data is then written into the user's SVOL 112b. Host 100b or host 160b (whichever is predesignated at the master host) accesses the user's SVOL(s) 112b to read stored data after a fail-over to secondary group 130b occurs. In other words, if failure occurs in the production site so that the primary group 130a is unable to perform assigned operations or tasks, then the host 100b or 160b in the secondary group 130b in the standby site will perform the operations and tasks for system 50a. Examples of failures that may trigger a fail-over includes host failure, storage system or disk failure, applications or software failure, hardware failure, signal paths or connections failure, and other types of failures in the production site that will prevent the host group 130a from performing assigned operations or tasks for system 50a.

Figure 2:
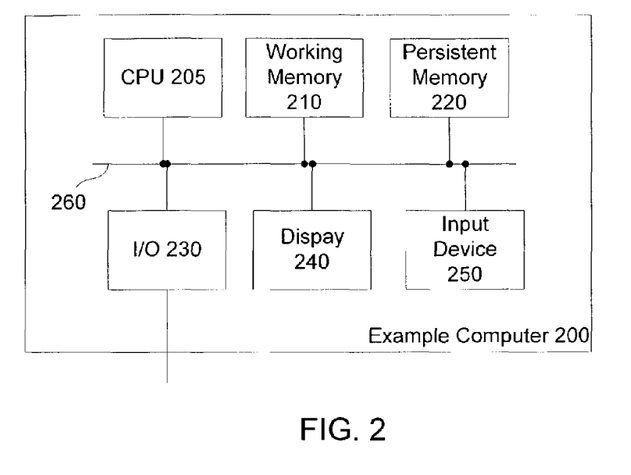
FIG. 2 is a block diagram illustrating an example computer in accordance with the present invention.

FIG. 2 is a block diagram illustrating an example computer 200 in accordance with the present invention. In an embodiment of the invention, hosts 100a, 160a, 100b, and 160b may include or be resident on example computer 200. The example computer 200 includes a central processing unit (CPU) 205; working memory 210; persistent memory 220; input/output (I/O) interface 230; display 240 and input device 250, all communicatively coupled to each other via system bus 260. CPU 205 may include an Intel Pentium® microprocessor, a Motorola Power PC® microprocessor, or any other processor capable to execute software stored in persistent memory 220. Working memory 210 may include random access memory (RAM) or any other type of read/write memory devices or combination of memory devices. Persistent memory 220 may include a hard drive, read only memory (ROM) or any other type of memory device or combination of memory devices that can retain data after example computer 200 is shut off. I/O interface 230 is communicatively coupled, via wired or wireless techniques, to other devices, such as storage system 110a. Display 240 may include a cathode ray tube display or other display device. Input device 250 may include a keyboard, mouse, or other device for inputting data, or a combination of devices for inputting data.

One skilled in the art will recognize that the example computer 200 may also include additional devices, such as network connections, additional memory, additional processors, LANs, input/output lines for transferring information across a hardware channel, the Internet or an intranet, etc. One skilled in the art will also recognize that the programs and data may be received by and stored in the example computer 200 in alternative ways.

Figure 3:
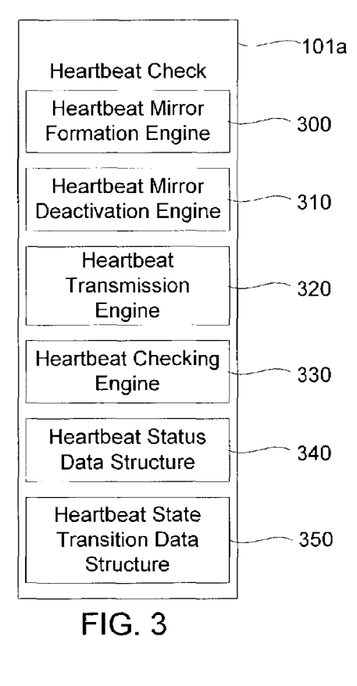
FIG. 3 is a block diagram illustrating a heartbeat check system of a host of the system of FIG. 1.

FIG. 3 is a block diagram illustrating heartbeat check 101a. In an embodiment of the invention, heartbeat check 101b is substantially similar to heartbeat check 101a. Heartbeat check 101a includes heartbeat mirror formation engine 300; heartbeat mirror deactivation engine 310; heartbeat transmission engine 320; heartbeat checking engine 330; heartbeat status data structure 340; and heartbeat state transition data structure 350.

Heartbeat mirror formation engine 300 sets up mirrored volumes to be used for site failure detection. In one embodiment, heartbeat mirror formation engine 300 displays a user interface on display 240 to enable a user to enter heartbeat volume device addresses, such as device addresses for heartbeat volume 111a and heartbeat volume 111b. In addition, heartbeat mirror formation engine 300 can display a warning to a user not to use a production volume as a heartbeat volume (since the heartbeat volumes constantly switch between a PVOL and SVOL state) and can verify that the user did not select a production volume as a heartbeat volume. After confirmation, heartbeat mirror formation engine 300 activates the heartbeat mirror and updates heartbeat status data structure 340 to indicate that a mirror has been enabled, as will be discussed further below.

In addition, heartbeat mirror formation engine 300 coordinates with heartbeat check 101b so that change state commands and check state commands are synchronized properly, as will be discussed further below. Heartbeat mirror formation engine 300 can perform coordination by sending heartbeat check 101b a schedule of when to send change state commands and when to check the state of its heartbeat volume 111b. Alternatively, heartbeat 101a and 101b can have preset schedules and therefore heartbeat mirror formation engine 300 may only need to confirm the current time with heartbeat check 101b. Heartbeat mirror formation engine 300 will be discussed in further detail in conjunction with FIG. 7.

Heartbeat mirror deactivation engine 310 deactivates heartbeat mirrors and updates heartbeat status data structure 340, accordingly. Heartbeat mirror deactivation engine 310 will be discussed in further detail in conjunction with FIG. 8.

Heartbeat transmission engine 320 sends change state commands to heartbeat volume 111a at regular intervals as will be discussed further below. Heartbeat checking engine 330 checks the state of the remote mirrored pair 111a at synchronized intervals including before heartbeat 101a is timed to issue a change state command and after heartbeat 101b is timed to issue a change state command. Specifically, heartbeat checking engine 330 checks whether heartbeat volume 111a is in a primary state or a secondary state and compares the result of the check with the most recently know state. If the state has changed after heartbeat 101b was supposed to issue a change state command, then heartbeat checking engine 330 performs a fail-over routine. In an alternative embodiment of the invention, heartbeat checking engine 330 can notify the system operator of a failure via displaying a warning. In another embodiment of the invention, heartbeat checking engine 330 can initiate a second method for failure detection and then initiate a fail-over procedure if the second method also indicates a failure.

Heartbeat status data structure 340, as will be discussed further in conjunction with FIG. 5, includes data on whether remote heartbeat mirrors are enabled. Further, heartbeat status data structure 340 retains data on remote group status, such as if remote group 130b has failed. Other data retained in heartbeat status data structure 340 includes device addresses and device status for devices used in the heartbeat mirror (e.g., heartbeat volumes 111a and 111b).

Heartbeat state transition data structure 350 stores data on the state of each heartbeat volume, such as heartbeat volumes 111a and 111b in a heartbeat mirrored pair. States possible for each volume include PVOL (primary volume); SVOL (secondary volume); SMPL (simplex—pair not created yet); suspended; and mirrored.

Figure 4:
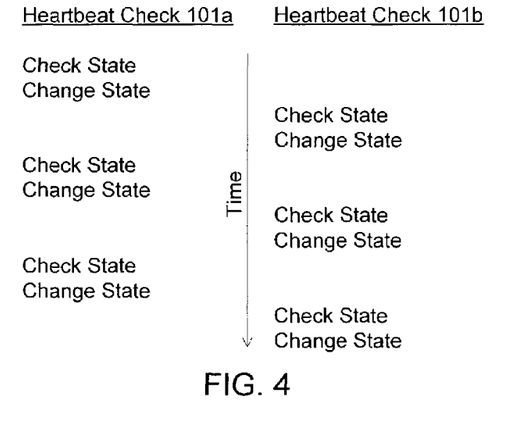
FIG. 4 is a diagram illustrating a sequence of transmitting change state commands and checking the state of heartbeat volumes according to an embodiment of the invention.

FIG. 4 is a diagram illustrating the sequence of transmitting change state commands and checking the state of heartbeat volumes 111a and 111b according to an embodiment of the invention. Heartbeat mirror formation engine 300 of heartbeat check 101a coordinates with heartbeat check 101b so as to perform the change state and check state actions in an appropriate sequence. In one embodiment of the invention, heartbeat check 101a first issues a check state and then a change state command (e.g., serially). Afterwards, heartbeat 101b issues a check state and change state command. The sequence repeats with heartbeat check 101a issuing a check state and then a change state command. Accordingly, heartbeat check 101a can determine if a failure has occurred at the standby site if the state of volume 111a has changed. Further, the sequence repeats and heartbeat check 101b can determine if a failure has occurred at the primary site if the state of volume 111b has changed. Each step of the sequence can be scheduled to occur at 1-minute intervals. In another embodiment of the invention, each step occurs at 2-minute intervals. It will be appreciated by one of ordinary skill in the art that different time intervals can be used in the sequence to balance accuracy and speed in fail-over detection. Alternatively, the initiation of the change state and check state commands can be event-based, user-initiated, etc. It will also be appreciated that heartbeat 101a and 101b can issue the change state commands at different time intervals if heartbeat 101a and heartbeat 101b are enabled for tolerance. For example, heartbeat check 101a can issue change state commands every 30 seconds and heartbeat check 101b can issue change state commands every 60 seconds, which leads to a failure indication. However, heartbeat 101a can be enabled to accept one failed change state test (or more) per cycle so that a single failed change state test doesn't indicate a site failure.

In an alternative embodiment of the invention, heartbeat check 101a checks the state of its heartbeat volume 111a before and after heartbeat 101b is supposed to issue a change state command to its heartbeat volume 111b. If there is no changed state (i.e., heartbeat volume 111a did not change from a PVOL to SVOL or vice versa) then the secondary host group 130b has failed. Similarly, heartbeat check 101b checks the state of its heartbeat volume 111b before and after heartbeat 101a is supposed to issue a change state command to its heartbeat volume 111a. If there is no changed state (i.e., heartbeat volume 111b did not change from a PVOL to SVOL or vice versa) then the primary host group 130a has failed. It will be appreciated that in both embodiments, there need not be a local change-state event to determine if a failure has occurred in another site. For example, the heartbeat checking engine 330 in heartbeat check 101a can confirm a change of state to confirm trouble free operations without the need for heartbeat transmission engine 320 sending change state commands.

In another embodiment of the invention, heartbeat check 101b issues change state commands change heartbeat volume 111b between a mirrored and suspended state. For example, heartbeat 101b can issue a synch command and then check the state of heartbeat volume 111b. Next, heartbeat 101b can issue a suspend command and check. The process then repeats and does not require any interaction by heartbeat check 101a. If after each check state there is no change, then there has been a failure of the production site and fail over procedures can be initiated.

In another embodiment of the invention, heartbeat check 101a and heartbeat check 101b can both issue change state (between mirrored and suspended) commands and check state commands so as to detect a failure at a remote site. For example, heartbeat check 101a can check the state of heartbeat volume 111a and then issue a change state command (e.g., suspend command). Heartbeat check 101b can then check the state of heartbeat volume 111b to confirm that the state is suspended, leading to the conclusion that there is no failure. If the state is unchanged (e.g., mirrored), then there is a failure and heartbeat 101b can initiate fail over procedures. If the state is change, then afterwards, heartbeat check 101b then issues a change state command (e.g., synch command) and heartbeat 101a checks heartbeat volume 111a to confirm that the state is now mirrored. If the state is not mirrored, then there has been a failure at the secondary site. This process then repeats.

In addition, these failure detection methods can be used to determine production site recovery. For example, a production site may have failed and fail over procedures to a standby site completed. Accordingly, the standby site is running the application 103b as temporary production site. In this situation, heartbeat check 101b can execute the single host heartbeat action as described above for detecting the recovery of production site. In this case, every time 101b checks the state after issuing "re-sync" (i.e., change to a mirrored state) command to heartbeat volume 111b, it never change to "Mirrored" state until the storage system 110a, remote mirroring link 150 and the paired heartbeat volume 111a are restored in the production site. Once heartbeat volume 111b changes to "Mirrored" state in response to the change state command, it means at least the storage system 110a, remote mirroring link 150 and the paired heartbeat volume 111a are restored in the production site. Then the system can start to prepare the pre "fall-back" process such as re-synchronizing the data volumes between the standby site and production site.

Figure 5:
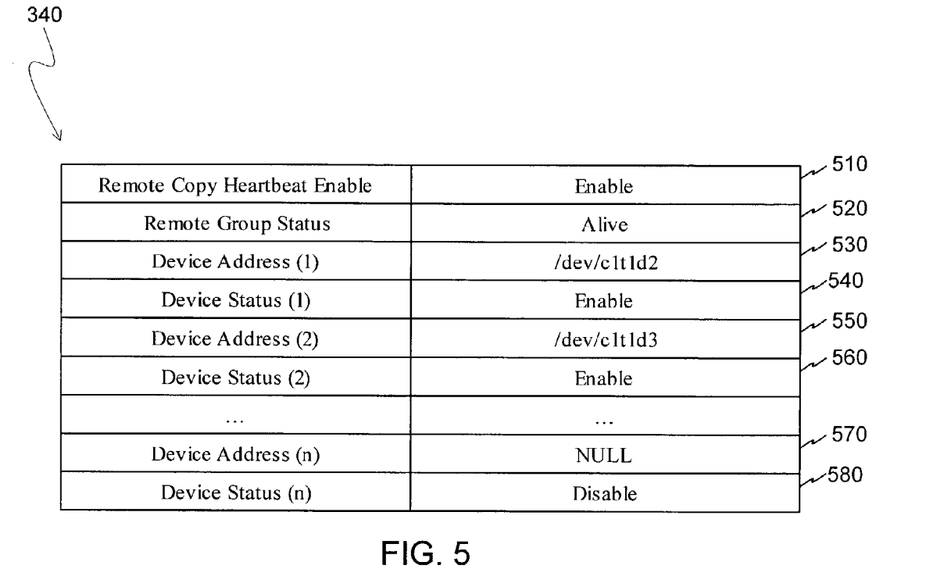
FIG. 5 is a diagram illustrating a heartbeat status data structure.

FIG. 5 is a diagram illustrating the heartbeat status data structure 340. Heartbeat status data structure 340 includes, in field 510, whether the remote copy heartbeat is enabled. In field 520, heartbeat status data structure 340 includes whether the remote group, such as secondary group 130b, is alive (i.e., not failed). Heartbeat status data structure 340, in fields 530, 550, and 570, retains device address data for heartbeat volumes, such as heartbeat volumes 111a. Heartbeat status data structure 340, in fields 540, 560, 580, holds data indicating if heartbeat volumes, such as heartbeat volume 111a, are enabled. Heartbeat mirror formation engine 300 and heartbeat mirror deactivation engine 310 can update heartbeat data structure 340 to indicate whether remote copy heartbeat is enabled (field 510) and also update device addresses (fields 530, 550, and 570). Heartbeat checking engine 330 updates field 520 indicating whether a remote group is alive. Field 520 can be used by heartbeat mirror formation engine 300 to indicate to a user whether a heartbeat mirror 111 can be formed.

Figure 6:
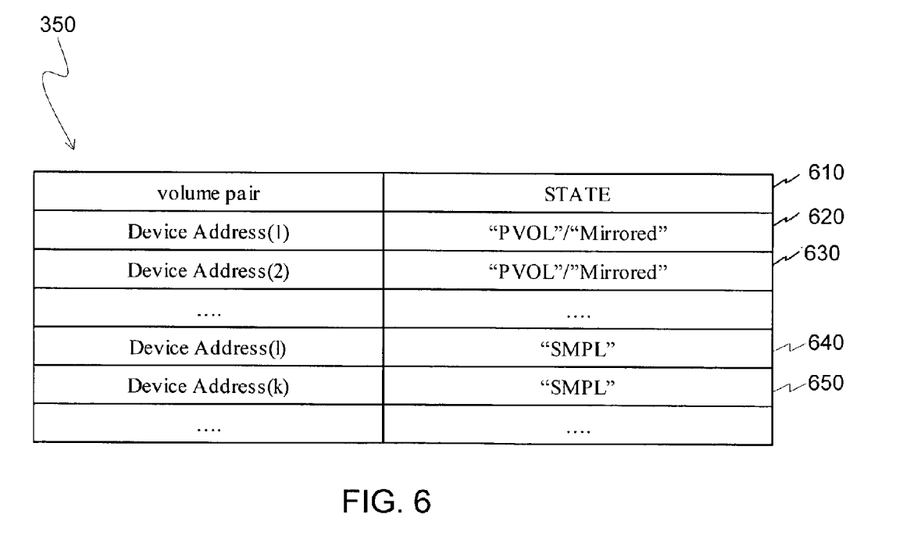
FIG. 6 is a diagram illustrating a heartbeat state transition data structure.

FIG. 6 is a diagram illustrating heartbeat state transition data structure 350. For each device address, there is a corresponding field indicating the status of the heartbeat volumes, such as heartbeat volume 111a. States include PVOL (primary volume), SVOL (secondary or storage volume), simplex (not mirrored), mirrored and suspended. Heartbeat checking engine 330 updates fields 620–640 indicating the state of the devices. Heartbeat checking engine 330 uses fields 620–640 to compare the state of heartbeat volume 111a before and after heartbeat check 101b issues a change state command to heartbeat volume 111b.

Figure 7:
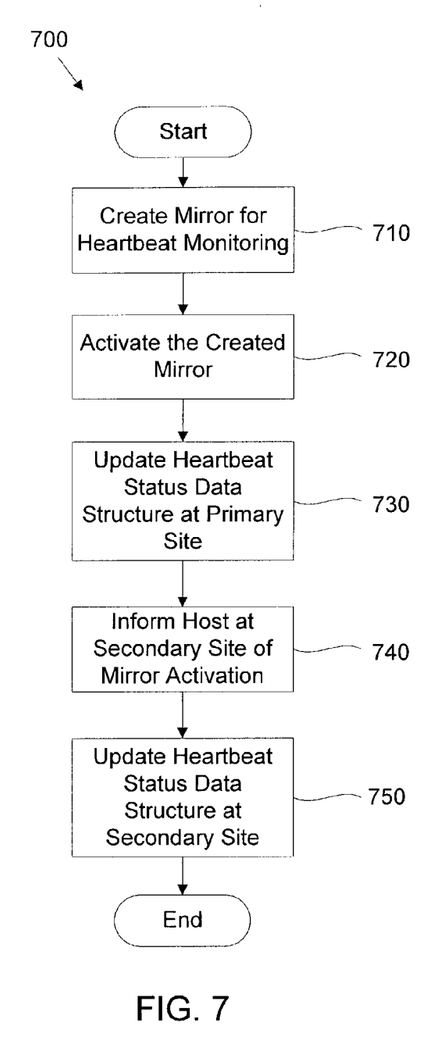
FIG. 7 is a flowchart illustrating a method of forming a heartbeat mirror.

FIG. 7 is a flowchart illustrating a method 700 of forming a heartbeat mirror. In an embodiment of the invention, heartbeat mirror formation engine 300 performs method 700. First, a mirror for heartbeat monitoring is created (710). The mirror is between two heartbeat volumes, such as heartbeat volumes 111a and 111b. The heartbeat volumes cannot be production volumes (e.g., volumes that store data used by application 103a) since the heartbeat volumes switch states at regular intervals.

Next, the mirror is activated (720) via a remote link, such as remote link 150. After activation (720), a heartbeat status data structure, such as heartbeat status data structure 340, is updated (730) to include data indicating activation of the mirror; device addresses of the local heartbeat volumes; whether each local heartbeat volume is enabled; and whether the remote group is alive.

After updating (730), a host at a secondary site, such as host 160b, is informed (740) of heartbeat formation and activation. In addition, coordinating information is sent to the host at the secondary site so that heartbeat check 101b can send change state command and perform check state operations in coordination with heartbeat check 101a. Examples of coordinating information include sending an ordered sequence of commands and times for the commands to be performed. Alternatively, the heartbeat check 101b can include a preset ordered sequence and the coordinating information only includes timing information.

After informing (740) the host, a heartbeat status data structure at the secondary site is updated. In one embodiment of the invention, a heartbeat mirror formation engine in heartbeat check 101b can perform the updating. Updating includes adding data indicating activation of the mirror; device addresses of the local heartbeat volumes; whether each local heartbeat volume is enabled; and whether the remote group is alive. The method 700 then ends.

Figure 8:
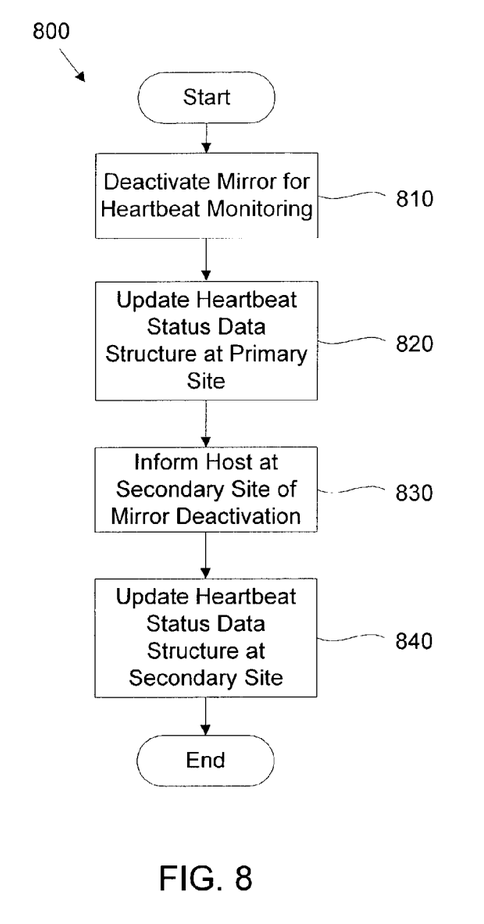
FIG. 8 is a flowchart illustrating a method for deactivating a heartbeat mirror.

FIG. 8 is a flowchart illustrating a method 800 for deactivating a heartbeat mirror. In an embodiment of the invention, heartbeat mirror deactivation engine 310 performs method 800. First, the heartbeat mirror is deactivated (810). Afterwards, a heartbeat status data structure, such as heartbeat status data structure 340, is updated (820) to indicate deactivation of the heartbeat mirror. For example, fields 510, 540 and 560 are changed to disabled. Next, a host at a secondary (or standby) site, such as host 160b is informed (830) of the deactivation. After being informed (830), a heartbeat status data structure at the secondary site is updated (840) in a manner similar to the updating (820) of the local heartbeat status data structure. The method 800 then ends.

Figure 9:
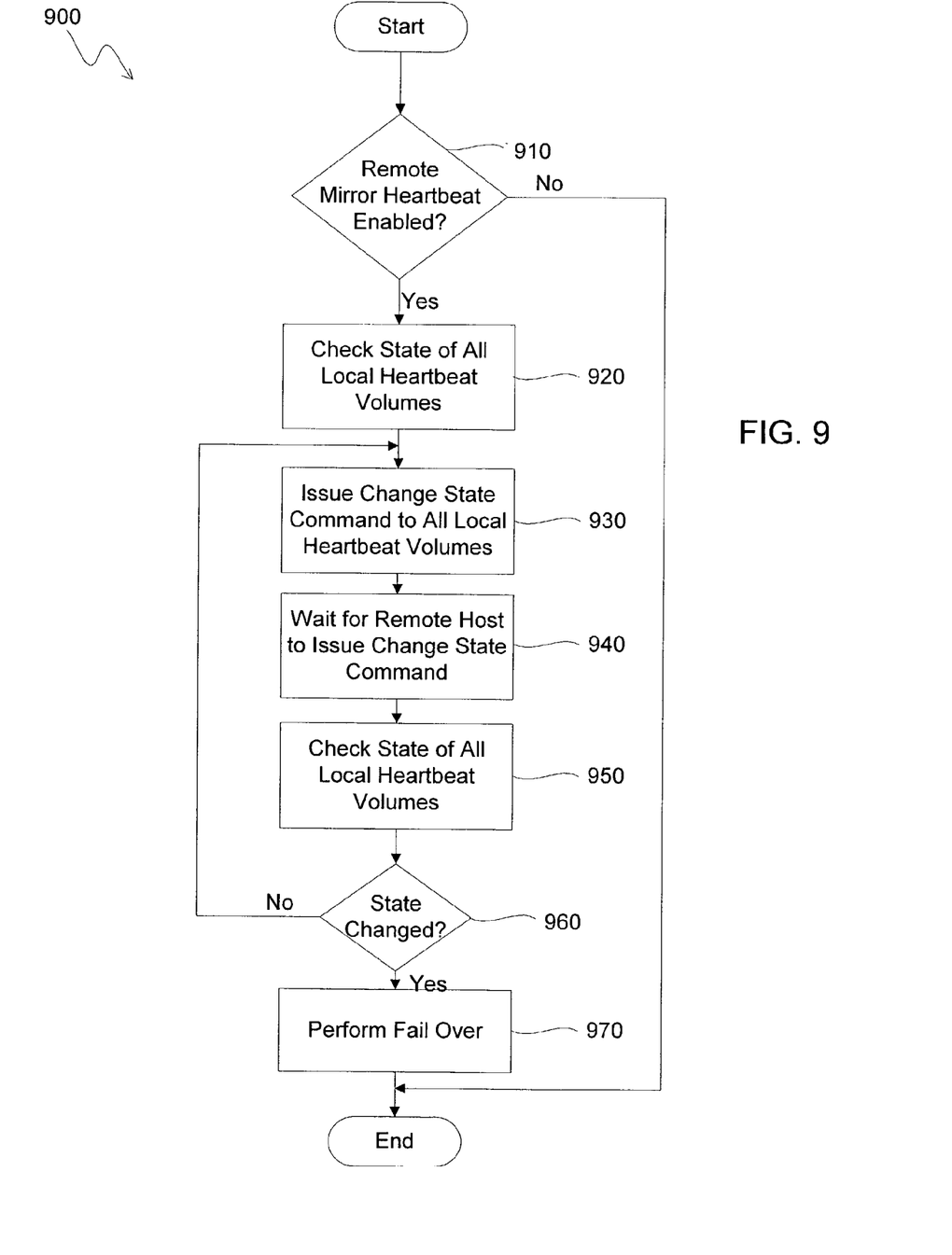
FIG. 9 is a flowchart illustrating a method for site failure detection.

FIG. 9 is a flowchart illustrating a method 900 for site failure detection. In general, the method 900 of site failure detection can be explained as follows: First, checking the state of the local volume at a certain time and then, comparing the state and a reference state. If there is difference between states, it can determined the remote pair is "dead". This reference state can be set by default. Alternatively, it can be determined by what kind of state change commands are used. Further, the reference state can be obtained before checking the state at a certain time. Changing the state is similar to a message sending mechanism and checking the state is similar to an inquiring mechanism. It depends on the implementation that what mechanism executes "changing the state", how many times "changing the state" is executed and also what kind of changing state command is used.

In an embodiment of the invention, heartbeat transmission engine 320 and heartbeat checking engine 330 jointly perform method 900. First, it is determined (910) if a remote heartbeat mirror, such as heartbeat mirror 170a, is enabled. This determination (910) may be made by checking field 510 of heartbeat status data structure 340. If the remote heartbeat mirror is not enabled, the method 900 ends. Otherwise, the state of all local heartbeat volumes, such as volume 111a, is checked (920) to see if they are PVOL or SVOL. In addition, heartbeat status data structure 340 can be updated with results of the check (920).

After checking (920), a change state command is issued (930) to all enabled local heartbeat volumes. The change state command causes all local and remote heartbeat volumes to change state. In one embodiment, the change state command changes heartbeat volumes from a PVOL state to a SVOL state and vice versa. In another embodiment of the invention, the change state command changes heartbeat volumes from a mirrored state to a suspended state and vice versa. After issuance (930) of the change state command, method 900 waits (940) for a remote host to issue a change state command to its local heartbeat volumes. The waiting can be based on a predetermined schedule.

After waiting (940), the state of the local heartbeat volumes are checked (950) again. The current state of the local heartbeat volumes are then compared (960) with the prior state as stored in heartbeat status data structure 340. As two consecutive change state commands were issued (one locally and one remotely), the state of the local remote heartbeat volumes should be unchanged. Different states indicate a failure of the remote site since this means that the remote site did not issue a change state command to return the heartbeat volumes to their original state. If the states are the same, then a change state command is issued (930) and the method 900 is repeated. If the states are not the same, fail over procedures are initiated (970), such as becoming the primary host and running application 104a. In an alternative embodiment of the invention, in place of, or in addition to initiating (970) fail over procedures, method 900 can include notifying a system operator of the failure via an aural and/or visual message and/or initiating a second failure detection technique to verify the failure. In another embodiment of the invention, if the states are not the same, then method 900 can include waiting for a preset amount of time and then repeating the check state (950) and comparison (960). If the states are still not the same, the fail over procedure can be initiated (970). Otherwise, a change state command is issued (930) and the method 900 is repeated.

Figure 10:
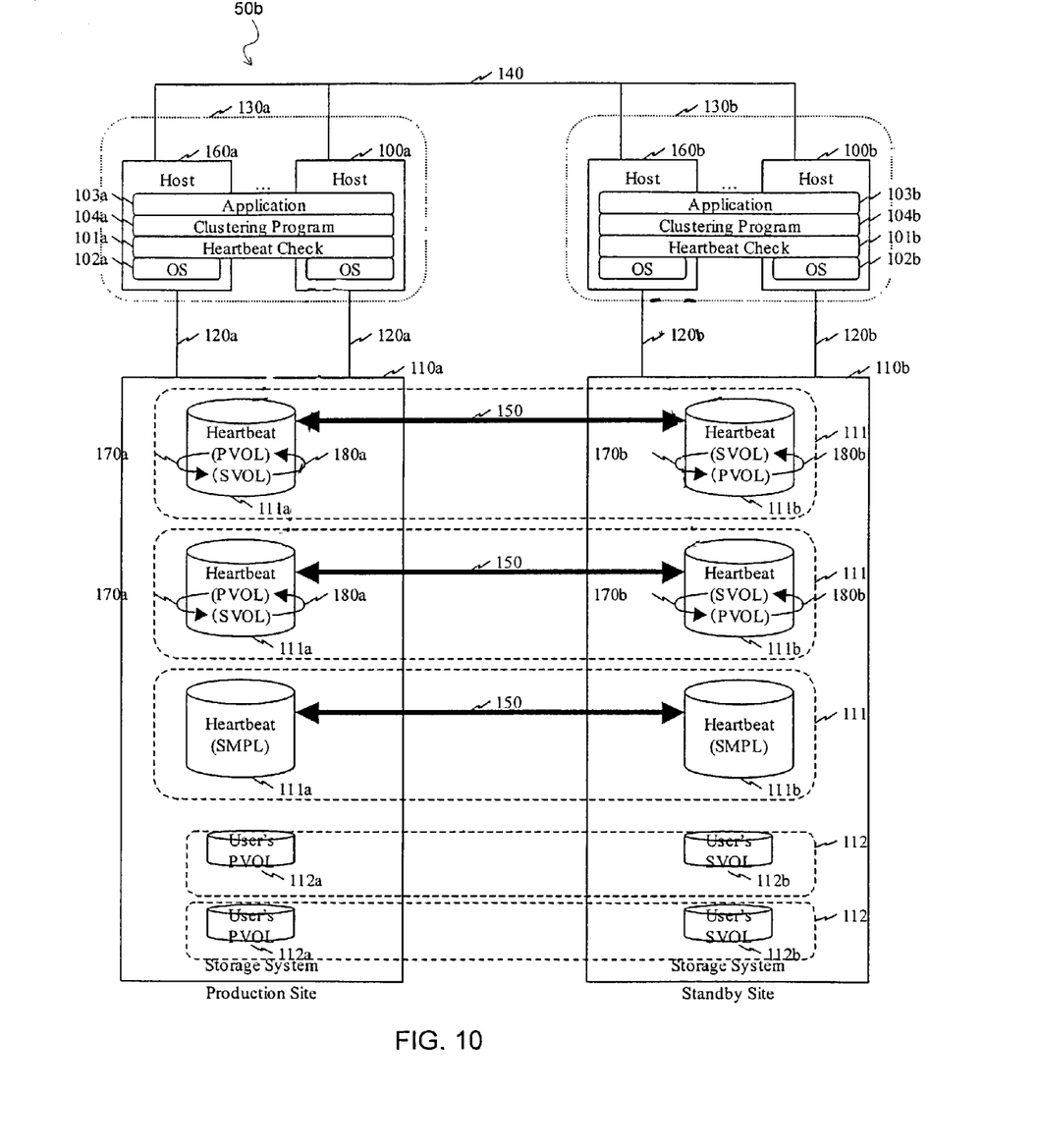
FIG. 10 is a block diagram illustrating a system in accordance with an embodiment of the invention.

FIG. 10 is a block diagram illustrating a system 50b in accordance with an embodiment of the invention. System 50b is substantially similar to system 50a. However, system 50b a second enabled heartbeat mirror for purposes of redundancy. If a first mirrored pair fails, failure detection can continue via the second heartbeat mirror.

The foregoing description of the illustrated embodiments of the present invention is by way of example only, and other variations and modifications of the above-described embodiments and methods are possible in light of the foregoing teaching. For example, the change state command can change a heartbeat volume from mirrored to suspended and vice versa instead of from PVOL to SVOL and vice versa. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
   obtaining, at a first time, a state of a local volume that is mirrored at a second location;
   issuing a first change state command associated with the local volume;
   obtaining, at a second time, the state of the local volume after a host at the second location issues a second change state command associated with a mirror volume; and
   comparing the state of the local volume at the first time and at the second time to determine if there has been a failure at the second location.

2. The method of claim 1, wherein the change state command includes changing a volume between a primary volume state and a secondary volume state.

3. The method of claim 1, wherein the change state command includes changing a volume between a mirrored state and a suspended state.

4. The method of claim 1, further comprising notifying a system operator of a failure based on the comparison.

5. The method of claim 1, further comprising sending a change state command to the local volume before obtaining, at a second time, the state of the local volume.

6. The method of claim 1, further comprising initiating a fail over procedure based on the comparison.

7. A computer-readable medium having stored thereon computer-executable instructions to perform a method, the method comprising:
   obtaining, at a first time, a state of a local volume that is mirrored at a second location;
   issuing a first change state command associated with the local volume;
   obtaining, at a second time, the state of the local volume after a host at the second location issues a second change state command associated with a mirror volume; and
   comparing the state of the local volume at the first time and at the second time to determine if there has been a failure at the second location.

8. The computer-readable medium of claim 7, wherein the change state command includes changing a volume between a primary volume state and a secondary volume state.

9. The computer-readable medium of claim 7, wherein the change state command includes changing a volume between a mirrored state and a suspended state.

10. The computer-readable medium of claim 7, the method further comprising notifying a system operator of a failure based on the comparison.

11. The computer-readable medium of claim 7, the method further comprising sending a change state command to the local volume before obtaining, at a second time, the state of the local volume.

12. The computer-readable medium of claim 7, the method further comprising initiating a fail over procedure based on the comparison.

13. A system, comprising:
   means for obtaining, at a first time, a state of a local volume that is mirrored at a second location;
   means for issuing a first change state command associated with the local volume;
   means for obtaining, at a second time, the state of the local volume after a host at the second location issues a second change state command associated with a mirror volume; and
   means for comparing the state of the local volume at the first time and at the second time to determine if there has been a failure at the second location.

14. A system, comprising:
   an engine operable to
      obtain, at a first time, a state of a local volume that is mirrored at a second location;

issue a first change state command associated with the local volume;

obtain, at a second time, the state of the local volume after a host at the second location issues a second change state command associated with a mirror volume; and compare the state of the local volume at the first time and at the second time to determine if there has been a failure at the second location.

15. The system of claim 14, wherein the change state command includes changing a volume between a primary volume state and a secondary volume state.

16. The system of claim 14, wherein the change state command includes changing a volume between a mirrored state and a suspended state.

17. The system of claim 14, wherein the engine is further capable to notify a system operator of a failure based on the comparison.

18. The system of claim 14, wherein the system further comprises a second engine, communicatively coupled to the first engine, capable to send a change state command to the local volume before the first engine obtains, at a second time, the state of the local volume.

19. The system of claim 14, wherein the first engine is further capable to initiate a fail over procedure based on the comparison.

20. A method, comprising:

checking a state of a local volume; wherein the local volume is mirrored at a remote site, issuing a first change state command to the local volume, wherein the first change state command is capable to change the local volume between a suspended state and a mirrored state; and checking the state of the local volume after the issuing and after the remote site issues a second change state command to determine if a failure at the remote site has occurred.

21. The method of claim 20, further comprising initiating a fail over procedure based on the checking.

22. The method of claim 20, further comprising notifying a system operator of a failure based on the checking.

23. A method, comprising:

checking if a state of a volume at a first location that is mirrored at a second location is a first state after a host at the first location issues a first command for changing state of a pair of the volume at the first location and the mirrored volume at the second location and after a host at the second location issues a second command for changing status of the pair; and determining if there has been a failure at the second location if the state is not the first state.

24. The method of claim 23, wherein the first command and the second command each comprise changing a volume between a primary volume state and a secondary volume state.

25. The method of claim 23, wherein the first command and the second command each comprise changing a volume between a mirrored state and a suspended state.

26. The method of claim 23, further comprising initiating a fail over procedure between the first and second locations.

27. The method of claim 23, further comprising obtaining a state of the volume at the first location before the host at the first location issues the first command, wherein the first state is the status in the obtaining step.

28. The method of claim 23, wherein the status change at the second location is change from alive status to dead status.

29. A system comprising:

a first storage system comprising a first heartbeat volume, the first heartbeat volume operable to be in one of a first state and a second state;

a second storage system coupled to the first storage system the second storage system comprising a second heartbeat volume; the second heartbeat volume operable to be in one of the first state and the second state; wherein the state of the first heartbeat volume mirrors the state of the second heartbeat volume;

a first host operatively coupled to the first storage system, operable to check a state of the first heartbeat volume and to issue a first change state command to the first heartbeat volume; and a second host operatively coupled to the second storage system, operable to check the state of the second heartbeat volume and to issue a second change state command to the second heartbeat volume;

wherein the first host is additionally operable to compare a first detected state of the first heartbeat volume before issuing the first change state command to a second detected state of the first heartbeat volume after the second host issues the second change state command; and to detect a failure if the first detected state is different from the second detected state.

30. The system of claim 29, wherein the second host is additionally operable to compare a first detected state of the second heartbeat volume before issuing the second change state command to a second detected state of the second heartbeat volume after the first host issues the first change state command; and to detect a failure if the first detected state is different from the second detected state.

31. The system of claim 29, wherein the first storage system further comprises a third heartbeat volume and the second storage system further comprises a fourth heartbeat volume.

32. The system of claim 29, further comprising a heartbeat state data structure comprising:

an address of the first heartbeat volume;

an address of the second heartbeat volume;

the state of the first heartbeat volume; and the state of the second heartbeat volume.

* * * * *